(12) United States Patent
Suthar

(10) Patent No.: US 10,949,728 B2
(45) Date of Patent: *Mar. 16, 2021

(54) TWO PIECE TRANSACTION CARD HAVING FABRIC INLAY

(71) Applicant: Capital One Services, LLC, McLean, VA (US)

(72) Inventor: Om J Suthar, Branbleton, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,285

(22) Filed: Feb. 20, 2020

(65) Prior Publication Data

US 2020/0193256 A1 Jun. 18, 2020

Related U.S. Application Data

(63) Continuation of application No. 16/154,000, filed on Oct. 8, 2018, now Pat. No. 10,607,130, which is a
(Continued)

(51) Int. Cl.
*G06K 19/02* (2006.01)
*G06K 19/077* (2006.01)
(Continued)

(52) U.S. Cl.
CPC ............ *G06K 19/0772* (2013.01); *B32B 3/04* (2013.01); *B32B 3/06* (2013.01); *B32B 3/08* (2013.01); *B32B 3/263* (2013.01); *B32B 3/266* (2013.01); *B32B 3/30* (2013.01); *B32B 5/022* (2013.01); *B32B 5/024* (2013.01); *B32B 5/026* (2013.01); *B32B 5/26* (2013.01); *B32B 5/28* (2013.01); *B32B 7/05* (2019.01); *B32B 7/08* (2013.01); *B32B 7/12* (2013.01); *B32B 15/08* (2013.01); *B32B 15/14* (2013.01); *B32B 21/02* (2013.01); *B32B 21/08* (2013.01); *B32B 21/10* (2013.01);
(Continued)

(58) Field of Classification Search
CPC ......... B32B 15/08; B32B 15/14; B32B 21/02; B32B 21/08; B32B 21/10; B32B 21/14; B32B 2250/02; B32B 2250/03; B32B 2255/02; B32B 2255/26; B32B 2262/0269; B32B 2262/0276; B32B 2262/062; G06K 19/0772; G06K 19/07722
See application file for complete search history.

(56) References Cited

U.S. PATENT DOCUMENTS 4,879,170 A 11/1989 Radwanski et al.
6,025,283 A 2/2000 Roberts
(Continued)

*Primary Examiner* — Thien M Le
(74) *Attorney, Agent, or Firm* — Finnegan, Henderson, Farabow, Garrett & Dunner, LLP

(57) ABSTRACT

Disclosed embodiments generally relate to a transaction card with a fabric inlay. The transaction card may include a housing component having a first housing surface opposite a second housing surface and an inlay component having a first inlay surface opposite a second inlay surface. The inlay and housing may be joined along the second inlay surface and the first housing surface. In addition, the first inlay surface may include a fabric material and a backer layer configured to support the fabric material of the first inlay surface.

20 Claims, 10 Drawing Sheets

Related U.S. Application Data continuation of application No. 15/704,288, filed on Sep. 14, 2017, now Pat. No. 10,108,897, which is a continuation of application No. 15/695,099, filed on Sep. 5, 2017, now Pat. No. 10,121,100.

(60) Provisional application No. 62/436,809, filed on Dec. 20, 2016.

(51) Int. Cl.

| | | |
|---|---|---|
| *B32B 5/02* | (2006.01) | |
| *B32B 5/26* | (2006.01) | |
| *B32B 5/28* | (2006.01) | |
| *B32B 7/08* | (2019.01) | |
| *B32B 7/12* | (2006.01) | |
| *B32B 15/08* | (2006.01) | |
| *B32B 15/14* | (2006.01) | |
| *B32B 21/02* | (2006.01) | |
| *B32B 21/08* | (2006.01) | |
| *B32B 21/10* | (2006.01) | |
| *B32B 21/14* | (2006.01) | |
| *B32B 27/12* | (2006.01) | |
| *B32B 27/30* | (2006.01) | |
| *B32B 27/34* | (2006.01) | |
| *B32B 27/36* | (2006.01) | |
| *B32B 27/40* | (2006.01) | |
| *B32B 3/04* | (2006.01) | |
| *B32B 3/06* | (2006.01) | |
| *B32B 3/08* | (2006.01) | |
| *B32B 3/26* | (2006.01) | |
| *B32B 3/30* | (2006.01) | |
| *B32B 7/05* | (2019.01) | |

(52) U.S. Cl.
CPC .............. *B32B 21/14* (2013.01); *B32B 27/12* (2013.01); *B32B 27/304* (2013.01); *B32B 27/308* (2013.01); *B32B 27/34* (2013.01); *B32B 27/36* (2013.01); *B32B 27/365* (2013.01); *B32B 27/40* (2013.01); *G06K 19/07722* (2013.01); *B32B 2250/02* (2013.01); *B32B 2250/03* (2013.01); *B32B 2255/02* (2013.01); *B32B 2255/26* (2013.01); *B32B 2262/0269* (2013.01); *B32B 2262/0276* (2013.01); *B32B 2262/062* (2013.01); *B32B 2262/106* (2013.01); *B32B 2270/00* (2013.01); *B32B 2274/00* (2013.01); *B32B 2307/4023* (2013.01); *B32B 2307/41* (2013.01); *B32B 2307/73* (2013.01); *B32B 2425/00* (2013.01); *B32B 2429/00* (2013.01); *B32B 2519/02* (2013.01)

(56) References Cited

U.S. PATENT DOCUMENTS

| | | |
|---|---|---|
| 9,834,883 B2 | 12/2017 | Hartert et al. |
| 2002/0145049 A1 | 10/2002 | Lasch et al. |
| 2006/0251869 A1 | 11/2006 | Herslow |
| 2006/0292946 A1 | 12/2006 | Kiekhaefer |
| 2009/0039154 A1 | 2/2009 | Williams et al. |
| 2011/0000110 A1 | 1/2011 | Wang et al. |
| 2011/0011939 A1* | 1/2011 | Seah ................ G06K 19/07749 235/492 |
| 2012/0038445 A1 | 2/2012 | Finn |
| 2012/0159698 A1 | 6/2012 | Hartert et al. |
| 2012/0276332 A1 | 11/2012 | Conolly et al. |
| 2013/0087622 A1 | 4/2013 | Collins et al. |
| 2014/0021261 A1* | 1/2014 | Mosteller ................ B32B 15/08 235/488 |
| 2014/0234600 A1 | 8/2014 | Wang et al. |
| 2014/0263657 A1 | 9/2014 | Scattergood |
| 2016/0171356 A1 | 6/2016 | Blum |
| 2017/0077589 A1 | 3/2017 | Finn et al. |
| 2017/0233904 A1 | 8/2017 | Weening et al. |
| 2017/0313118 A1 | 11/2017 | Pyo et al. |
| 2017/0364781 A1* | 12/2017 | Mosteller ............ B32B 38/0004 |
| 2018/0025261 A1* | 1/2018 | Mosteller ......... G06K 19/07769 235/488 |
| 2018/0150735 A1* | 5/2018 | Suthar ................... B32B 21/042 |
| 2019/0057294 A1* | 2/2019 | Suthar ................... B32B 27/304 |
| 2019/0385035 A1* | 12/2019 | Mosteller ............. B42D 25/373 |

\* cited by examiner

TWO PIECE TRANSACTION CARD HAVING FABRIC INLAY

CROSS-REFERENCE TO RELATED APPLICATIONS

This application is a continuation of and claims the benefit of and priority to U.S. application Ser. No. 16/154,000, filed Oct. 8, 2018, which is a continuation of and claims the benefit of and priority to U.S. application Ser. No. 15/704,288 filed Sep. 14, 2017, which is a continuation of and claims the benefit and priority to U.S. application Ser. No. 15/695,099, filed Sep. 5, 2017, which claims priority to U.S. Provisional Application No. 62/436,809, filed Dec. 20, 2016, the contents of which are incorporated herein by reference.

TECHNICAL FIELD

The disclosed embodiments generally relate to transaction card constructions. More particularly, and without limitation, the disclosed embodiments relate to a two-piece transaction card having a fabric inlay.

BACKGROUND

Transaction cards, such as credit and debit cards, have become a primary means for individuals to complete transactions involving data exchange. Traditional transaction cards are formed of plastic material as a single piece. For example, a typical credit card may be manufactured out of PVC plastic using an injection molding process. The plastic card may then be modified to add functional and/or visual features. For example, a magnetic strip may be affixed to one side, the card may be stamped with the card number and customer name, and color or a design may be added for appearance.

Some transaction cards may also include advanced data storage components attached to or embedded within the card. For example, some transaction cards may include microchips (e.g., EMV chips) that more securely and efficiently manage card and customer information and/or near field communication (NFC) components that can wirelessly communicate with outside devices (e.g., a point of sale device, mobile device, etc.). While these types of technology provide several advantages to customers, the conventional, one-piece transaction card and associated methods of construction may not be ideal and could likely benefit significantly from improvements.

In addition, as transaction cards increase in prevalence, expectations for transaction card quality have increased. Transaction cards have increasingly been made to meet higher standards regarding materials, durability, security, and appearance. Further, traditional card manufacturing methods, which have employed limited card construction techniques and materials, continue to utilize techniques and materials that restrict variations in card style and appearance. For example, card users may desire a customizable card, or a card having particular features, such as a desired appearance, texture, weight, material type, etc.

The present disclosure is directed to improvements in transaction cards and methods of manufacture thereof.

SUMMARY

The disclosed embodiments relate to a transaction card and a process/method for constructing the card, wherein the card includes a fabric inlay.

It is to be understood that both the foregoing general description and the following detailed description are exemplary and explanatory only and are not restrictive of the disclosed embodiments, as claimed.

Consistent with disclosed embodiments, a transaction card may comprise a housing component having a first housing surface opposite a second housing surface; and an inlay component having a first inlay surface opposite a second inlay surface, the inlay and housing being joined along the second inlay surface and the first housing surface, the first inlay surface comprising: a fabric material; and a backer layer configured to support the fabric material of the first inlay surface.

Consistent with disclosed embodiments, a method of manufacturing a transaction card may comprise forming a housing component having a first housing surface opposite a second housing surface; forming an inlay component having a first inlay surface opposite a second inlay surface, the inlay component comprising a backer layer configured to support a fabric layer; applying a fabric material to the backer layer to form the first inlay surface; and joining the housing component and the inlay component via the second inlay surface and the first housing surface.

BRIEF DESCRIPTION OF THE DRAWINGS

The accompanying drawings, which are incorporated in and constitute a part of this specification, illustrate disclosed embodiments and, together with the description, serve to explain the disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments include a two-piece transaction card with an inlay. The inlay may comprise a fabric material, or it may resemble a fabric or fabric-like material. Disclosed embodiments further include a two-piece transaction card having two separate card components that may be connectable to form the transaction card. In some embodiments, the two card components, when connected, may define a space for receiving at least one data storage component. Various methods may be used to manufacture the separate card components out of different types of materials that are suitable for satisfying certain criteria or preferences. In addition, the construction of the separate components may allow for ease of assembly, as well as interchangeability of the components.

The term "transaction card," as used herein, may refer to a physical card product that is provided with features to receive, store, and/or transmit transaction information. As used herein, the term "personal information" may include information that is associated with a user of the card or information associated with an account of/for the card user. For example, personal information may include "transaction information," such as financial information (e.g., card numbers, account numbers, expiration dates etc.), quasi-financial information (e.g., rewards balance, discount information, etc.), individual-identifying information (e.g., name, address, etc.), bank information, and/or transaction network information. Examples of transaction cards may include credit cards, debit cards, gift cards, rewards cards, frequent flyer cards, merchant-specific cards, discount cards, identification cards, membership cards, and driver's licenses, but are not limited thereto.

The physical properties of the transaction card (e.g., size, flexibility, location of various components included in the card) may meet various international standards, including, for example, ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/IEC 7810.

Figure 1:
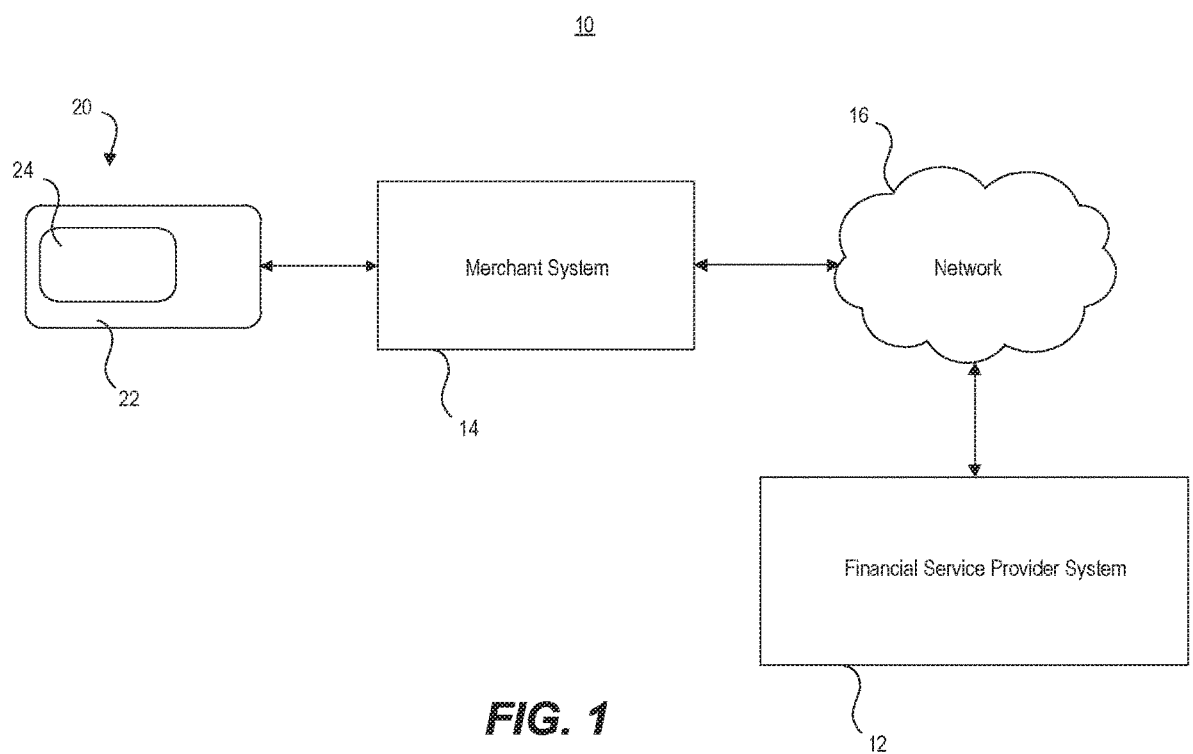
FIG. 1 is a block diagram of an exemplary transaction system, consistent with disclosed embodiments.

FIG. 1 illustrates an exemplary transaction system 10. Transaction system 10 may be a computing system configured to receive and send information between the components of transaction system 10 and/or with components outside of system 10. Transaction system 10 may include a financial service provider system 12 and a merchant system 14, which may be connected by a network 16. It should be understood, however, that transaction system 10 may include additional and/or alternative components.

Financial service provider system 12 may be one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service account. Financial service accounts may be associated with physical financial service transaction cards, such as a credit or debit cards that a user may carry on their person and use to perform financial service transactions, such as purchasing goods and/or services at a point of sale (POS) terminal. Financial service accounts may also be associated with electronic financial products and services, such as a digital wallet or similar account that may be used to perform electronic transactions, such as purchasing goods and/or services online.

Merchant system 14 may be one or more computer systems associated with a merchant. For example, merchant system 14 may be associated with an entity that provides goods and/or services (e.g., a retail store). The merchant may include brick-and-mortar location(s) that a customer may physically visit and purchase goods and services. Such physical locations may include computing devices (e.g., merchant system 14) that perform financial service transactions with customers (e.g., POS terminal(s), kiosks, etc.). Additionally or alternatively, merchant system 14 may be associated with a merchant who provides electronic shopping mechanisms, such as a website or a similar online location that consumers may access using a computer through browser software, a mobile application, or similar software. Merchant system 14 may include a client device, such as a laptop computer, desktop computer, smart phone, or tablet, that a customer may operate to accesses the electronic shopping mechanism.

Network 16 may be any type of network that facilitates communications and data transfer between components of transaction system 10, such as, for example, financial service provider system 12 and merchant system 14. Network 16 may include but is not limited to a Local Area Network (LAN), a Wide Area Network (WAN), such as the Internet, and may be a single network or a combination of networks. Network 16 is not limited to the above examples, and transaction system 10 may implement any type of network that allows the entities (shown and not shown) of transaction system 10 to exchange data and information.

Transaction system 10 may be configured to conduct a transaction associated with the use of a transaction card 20. In one example, financial service provider system 12 may provide transaction card 20 to a customer for use in conducting transactions associated with a financial service account held by the customer. In an example of one such transaction, the customer may use transaction card 20 at a merchant location to make a purchase. During the course of the purchase, information may be transferred from transaction card 20 to merchant system 14 (e.g., a point of sale device). Merchant system 14 may communicate with financial service provider system 12 via network 16 to complete the transaction. For example, merchant system 14 may receive account information from transaction card 20. Merchant system 14 may transmit the account information and a purchase amount, among other transaction information, to financial service provider system 12. Financial service provider system 12 may settle the transaction by transferring funds from the customer's financial service account to a financial service account associated with the merchant.

For example, in some embodiments, transaction card 20 may include a data storage component 24 disposed in a card frame 22. As used herein, a "data storage component" may be or include one or more devices configured to receive, store, process, provide, transfer, send, delete, and/or generate data or other information. For example, data storage component 24 may include a microchip (e.g., EMV chip), a communication device (e.g., Near Field Communication (NFC) antenna, radiofrequency identification (RFID) device, Bluetooth® device, WiFi device), a magnetic strip, a barcode, a Quick Response (QR) code, and/or other devices. Data storage device 24 may be configured to store information in a computer-readable format. For example, data storage device may be configured to store information in a format that can be read by merchant system 14, transmitted over network 16, and read or processed by financial service provider system 12.

While transaction system 10 and transaction card 20 are depicted and described in relation to transactions that involve customers, merchants, and financial service providers, it should be understood that these entities are used only as an example to illustrate one environment in which transaction card 20 may be used. It should be understood that transaction card 20 is not limited to financial products and may be any physical card product that is configured to receive, store, and/or transmit information. For example, transaction card 20 may be an identification card configured to provide information for identifying the holder of the card (e.g., driver's license).

Figure 2:
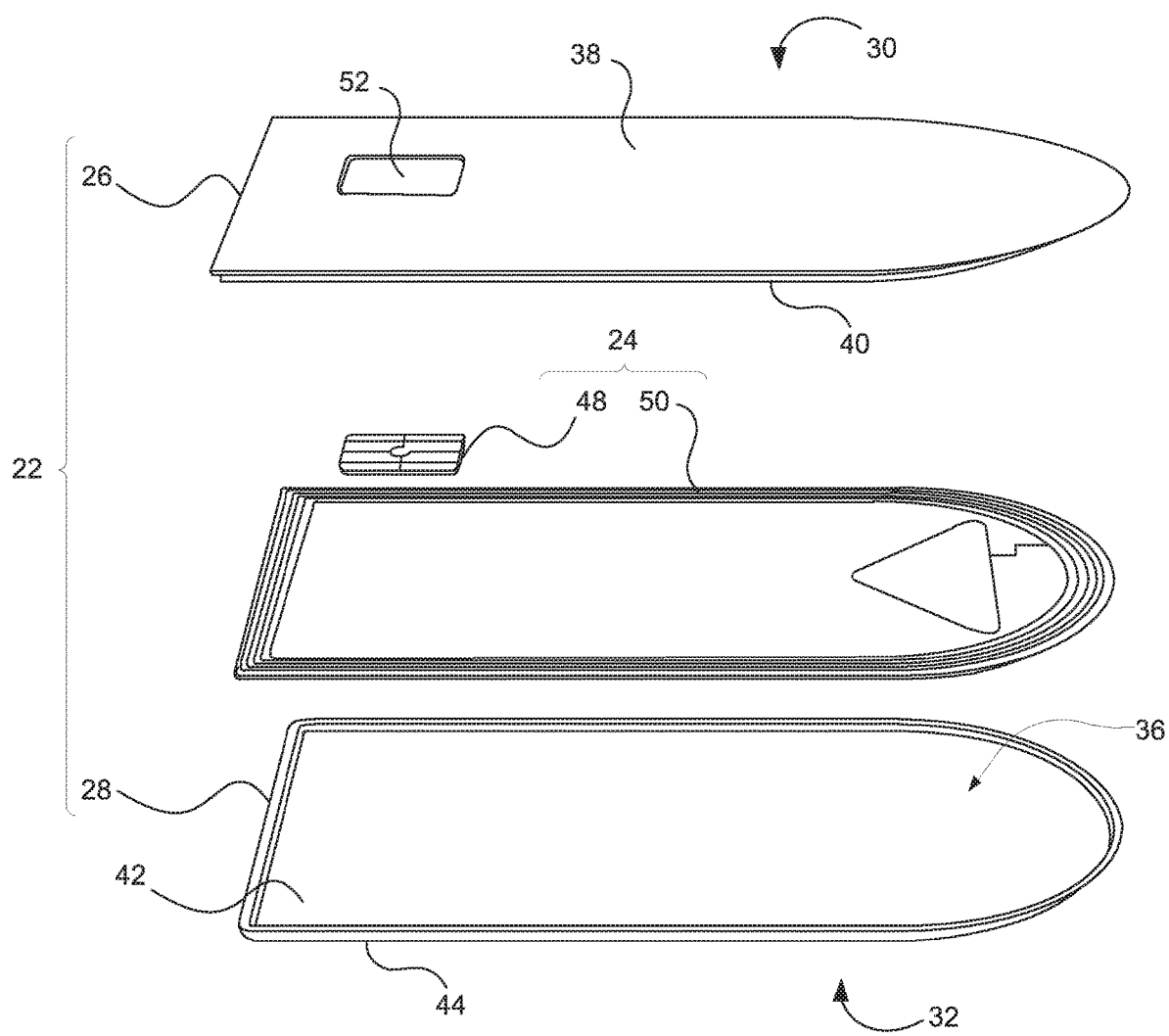
FIG. 2 is an exploded-view illustration of an exemplary transaction card, consistent with disclosed embodiments.

Referring to FIG. 2, in an exemplary embodiment, transaction card 20 may include card frame 22 having an inlay component ("inlay") 26 and a housing component ("housing") 28. Inlay 26 may be visible from a first side 30 of transaction card 20, and housing 28 may be visible from a second side 32 of transaction card 20 opposite first side 30. Inlay 26 and housing 28 may be separate components that are connectable to form card frame 22. That is, housing and inlay components 26 and 28 may be non-unitary (i.e., formed initially as two distinct components).

Inlay 26 may have a first inlay surface 38 and a second inlay surface 40 opposite first inlay surface 38. First inlay surface 38 may be visible from first side 30 and, as described below, may include visible information (e.g., personal information). Housing 28 may include a first housing surface 42 and a second housing surface 44 opposite first housing surface 42. Second housing surface 44 may be visible from second side 32 of card 20 and, as described below, may also or alternatively include visible information. Inlay 26 and housing 28 may be configured to be joined or connected via second inlay surface 40 and first housing surface 42 using various techniques. For example, in some embodiments, inlay 26 and housing 28 may be discrete layers that are stacked or abutted and joined by a suitable technique or mechanism, such as (but not limited to) adhesive materials, fasteners, interconnecting features (e.g., snap-fit features), interference fit, and/or combinations thereof. Other joining techniques or mechanisms may be used.

As will be described in further detail below, inlay 26 may be a top outward-facing component of card 20. In some embodiments, inlay 26 may be partially set into housing 28. In other embodiments, inlay 26 not be set into housing 28 but may otherwise be affixed thereto. Inlay 26 may include a fabric material, which may be visible from first side 30 or second side 32 of card 20. Methods/processes of forming inlay 26 will be discussed in further detail below.

Housing 28 may be a bottom outward-facing component of card 20. Housing 28 may be configured to house or contain other components of card 20. Housing 28 may include a cavity 36 that partially defines a space (not depicted in FIG. 2) (i.e., a void space) within card 20 when housing and inlay components 26 and 28 are assembled (space is shown as 34 in FIGS. 5C and 6C). In some embodiments, data storage component 24 may be disposed within cavity 36 to house and/or protect data storage component 24 from the elements, from wear-and-tear, and/or from tampering. For example, in some embodiments, cavity 36 may be configured (e.g., sized, shaped, etc.) to at least partially contain one or more of a microchip 48 (e.g., an EMV chip), a communication device 50 (e.g., an NFC or RFID device), and/or a magnetic strip (not shown). In other embodiments, cavity 36 may be configured to at least partially contain other or additional types of data storage components and/or other card components and is not limited to those mentioned above.

Housing 28 may be formed of multiple separate components or as a unitary structure. For example, housing 28 may be formed using molding process, such as an injection molding, compression molding, or other type of molding process. Housing 28 may be formed of, for example, polycarbonate (PC), polyvinyl chloride (PVC), or a resin mixture configured to impart additional or desired properties on housing 28. For example, housing 28 may be formed of a resin mixture comprising one or more of a thermoplastic elastomer (TPE), polybutylene terephthalate (PBT), an acetal homopolymer, and/or other materials. In some embodiments, the TPE and/or other materials may be selected to provide card 20 with a "soft-touch feel" (i.e., a haptic sensation that occurs when a person touches something that, for example, feels soft, smooth, and/or satiny). In some embodiments, the resin mixture may include a polyester elastomer, a block copolymer, a thermoplastic olefin, an elastomeric alloy, a thermoplastic polyurethane, a thermoplastic copolyester, or a thermoplastic polyamide. In some embodiments, housing 28 may be non-opaque (e.g., translucent, transparent, clear, etc.) after manufacturing is complete (e.g., after setting).

Interior features of housing 28 may be formed during the formation of housing 28 (e.g., during injection molding, compression molding, etc.) or during a subsequent manufacturing process. For example, interior features of housing 28, such as cavity 36, may be formed using a milling process (e.g., computer numeric control (CNC) or manual milling), a laser-cutting process, a sanding or grinding process, or a material deposition process (e.g., 3-D printing).

Card 20 may be configured to permit, enable, or enhance data transmission functions of data storage device 24. For example, in some embodiments, an aperture 52 may be provided on or in inlay 28 to permit, enable, and/or enhance transmission functions of data storage component 24. Aperture 52 may be configured to allow data storage component 24 to transmit information through physical contact, optical recognition, radiofrequency communication, or other mechanisms. In other embodiments, aperture 52 may also or alternatively be provided on or in housing 28. Aperture 52 may be formed using a milling process, laser-cutting process, stamping process, or another suitable process.

As used herein, the term "forming," when used to describe methods, processes, or steps of forming components or features of transaction cards, may encompass acts of constructing components from constituent or stock materials. The term "forming" may also encompass acts of "providing" components that have already been constructed from constituent or stock materials.

Figure 3A:
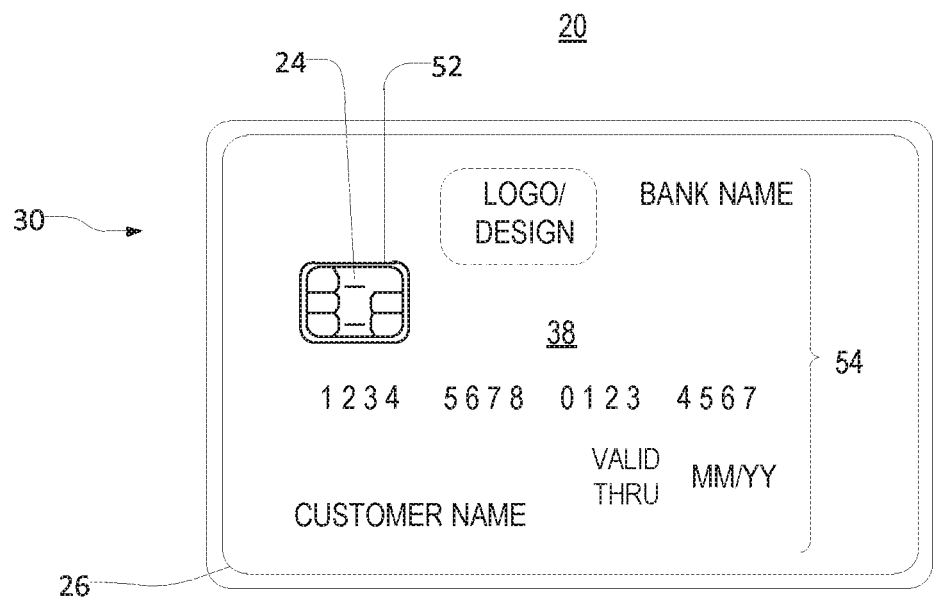
FIG. 3A is a top view of an exemplary transaction card consistent with disclosed embodiments.

FIG. 3A shows a front view of card 20 from first side 30. As shown, inlay 26 may include visible information 54. Visible information 54 may include, for example, personal information, such as information that is associated with a card, a user of the card, or information relating to an account associated with the card or card user. In some embodiments, visible information 54 may include "transaction information," such as financial information (e.g., card numbers, account numbers, expiration dates etc.), individual-identifying information (e.g., name, address, signature, etc.), bank information, and/or transaction network information, logos, designs, graphics, and/or other information.

Visible information 54 may be disposed on first inlay surface 38 to enable information 54 to be visible from first side 30 of card 20. In some embodiments, visible information 54 may be formed into first inlay surface 38. That is, for example, visible information 54 may be stamped (i.e., through the formation of one or more mechanical indents), printed, etched, milled, laser-cut, embossed, embroidered, stitched, woven, etc., into or onto first inlay surface 38 (i.e., into or onto the fabric material of first inlay surface 38). In other embodiments, visible information 54 may be disposed on second housing surface 44 in a similar manner.

In some embodiments, an aperture 52 may be disposed on first inlay surface 38 and configured to provide access to or enable functionality of a data storage component 24 (e.g., an EMV chip).

Figure 3B:
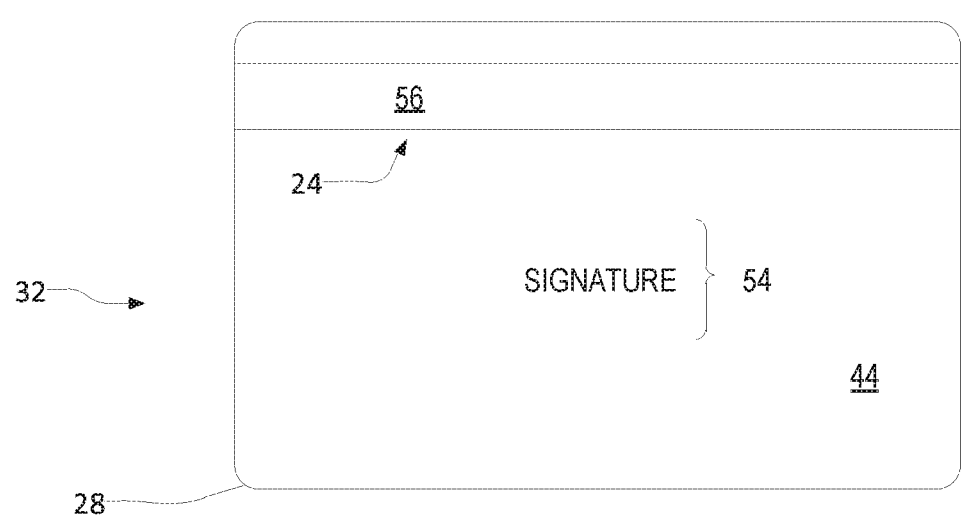
FIG. 3B is a bottom view of the exemplary transaction card of FIG. 3A.

FIG. 3B shows a rear view of card 20 from second side 32. Second housing surface 44 may be visible from second side 32. In some embodiments, visible information 54 may be disposed on second housing surface 44 instead of or in addition to first inlay surface 38. Information 54 visible from second side 32 may include any information described above with respect to information 54 visible from first side 30. Other or additional information may also or alternatively be included.

In some embodiments, as shown in FIG. 3B, data storage component 24 may be visible or otherwise accessible from second side 32. For example, in some embodiments, a magnetic strip 56 may be disposed on or accessible from (i.e., readable from) second housing surface 44. In other embodiments, an aperture (not shown) may be disposed on second housing surface 44 and configured to provide access to or enable functionality of a data storage component. In other embodiments, one or more data storage components may be disposed within card 20 (e.g., in cavity 36 of housing 28) and configured to perform data transmission functions through the material of housing 28 and/or inlay 26 without an aperture.

Figure 4A:
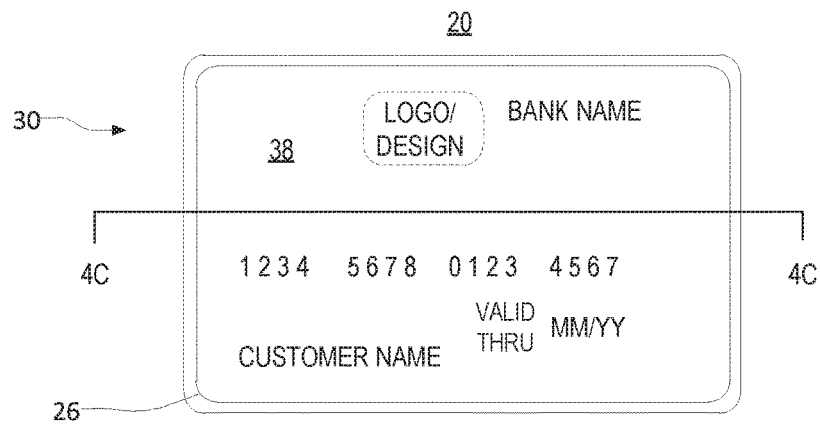
FIG. 4A is a top view of an exemplary transaction card consistent with disclosed embodiments.
Figure 4B:
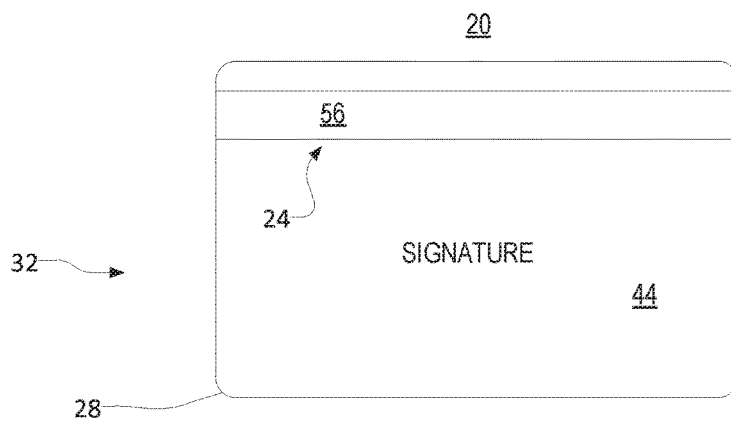
FIG. 4B is a bottom view of the exemplary transaction card of FIG. 4A.
Figure 4C:
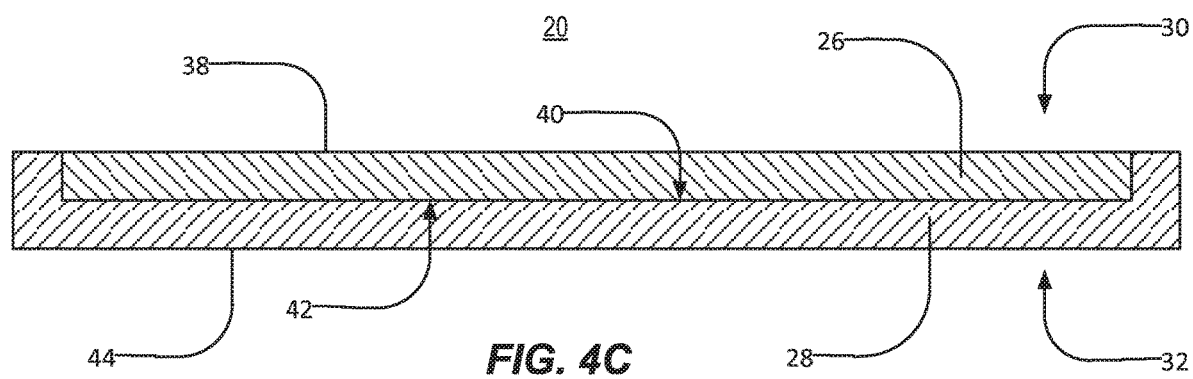
FIG. 4C is a cross-sectional view of the exemplary transaction card of FIG. 4A taken along the line 4C-4C.

FIGS. 4A-4C show an exemplary embodiment of card 20 without a microchip or internal data storage component. FIG. 4A shows a front view of card 20 from first side 30. As shown, first inlay surface 38 may not include an aperture. A data storage component 24, such as a magnetic strip 56, may be disposed on second housing surface 44 and visible from second side 32 of card 20, as shown in FIG. 4B. FIG. 4C depicts a cross-sectional view of card 20 of FIGS. 4A and 4B along line 4C-4C. As shown in FIG. 4C, inlay 26 and housing 28 may be joined via second inlay surface 40 and first housing surface 42. First inlay surface 38 may face outward (with respect to card 20) and away from first and second housing surfaces 42, 44. That is, first inlay surface 38 may face and be visible from first side 30 of card 20. Second inlay surface 40 may face inward (with respect to card 20) and toward first and second housing surfaces 42, 44. First housing surface 42 may face inward (with respect to card 20) and toward first and second inlay surfaces 38, 40. Second housing surface 44 may face outward (with respect to card 20) and away from first and second inlay surfaces 38, 40. That is, second housing surface 44 may face and be visible from second side 32 of card 20.

Figure 5A:
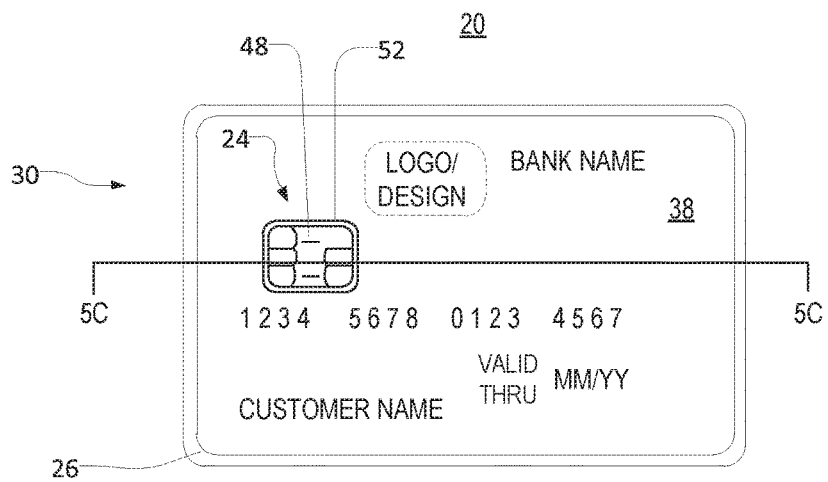
FIG. 5A is a top view of an exemplary transaction card consistent with disclosed embodiments.
Figure 5B:
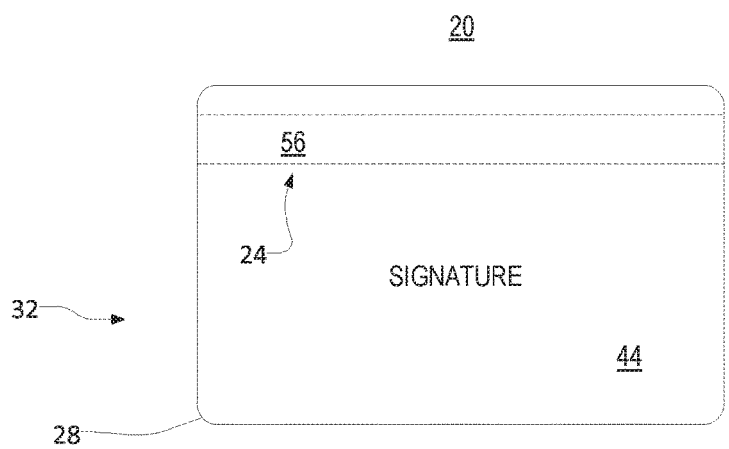
FIG. 5B is a bottom view of the exemplary transaction card of FIG. 5A.
Figure 5C:
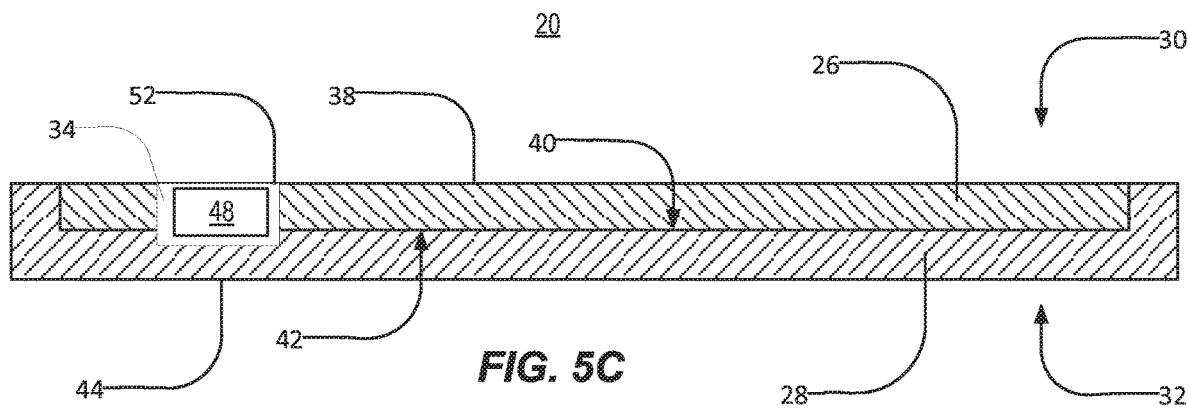
FIG. 5C is a cross-sectional view of the exemplary transaction card of FIG. 5A taken along line 5C-5C.

FIGS. 5A-5C show an exemplary embodiment of card 20 having a microchip 48 as a first data storage component 24. FIG. 5A shows a front view of card 20 from first side 30. As shown, first inlay surface 38 may include aperture 52. Microchip 48 may be accessible (i.e., able to participate in data transfer) via aperture 52. As shown in FIG. 5B, second data storage component 24, such as a magnetic strip 56 (shown in dashed lines as an optional component), may be disposed on second housing surface 44 and visible from second side 32 of card 20.

FIG. 5C depicts a cross-sectional view of card 20 of FIGS. 5A and 5B along line 5C-5C. As shown in FIG. 5C, aperture 52 may partially define space 34. Space 34 may be a void space within card 20 or its components (e.g., within one or more of inlay 26 and housing 28). Space 34 may be configured to house or contain microchip 48. In the embodiment of FIG. 5C, space 34 may extend from first inlay surface to below first housing surface 42, but not to second housing surface 44. That is, space 34 may extend through inlay 26 and partially through housing 28. In other embodiments, space 34 may extend fully or only partially through inlay 26, but not into housing 28. In other embodiments, space 34 may extend from an aperture in second housing surface 44 into housing 28 toward first inlay surface 42 (e.g., partially or fully through housing 28) and may extend partially into inlay 26 (i.e., through second inlay surface 40 but not first inlay surface 38).

As also shown in FIG. 5C, inlay 26 and housing 28 may be joined via second inlay surface 40 and first housing surface 42. First inlay surface 38 may face outward (with respect to card 20) and away from first and second housing surfaces 42, 44. That is, first inlay surface 38 may face and be visible from first side 30 of card 20. Second inlay surface 40 may face inward (with respect to card 20) and toward first and second housing surfaces 42, 44. First housing surface 42 may face inward (with respect to card 20) and toward first and second inlay surfaces 38, 40. Second housing surface 44 may face outward (with respect to card 20) and away from first and second inlay surfaces 38, 40. That is, second housing surface 44 may face and be visible from second side 32 of card 20.

Figure 6A:
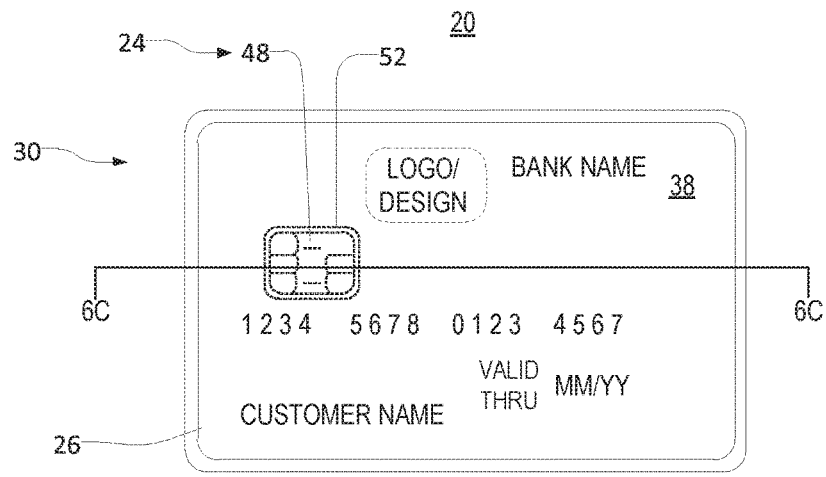
FIG. 6A is a top view of an exemplary transaction card consistent with disclosed embodiments.
Figure 6B:
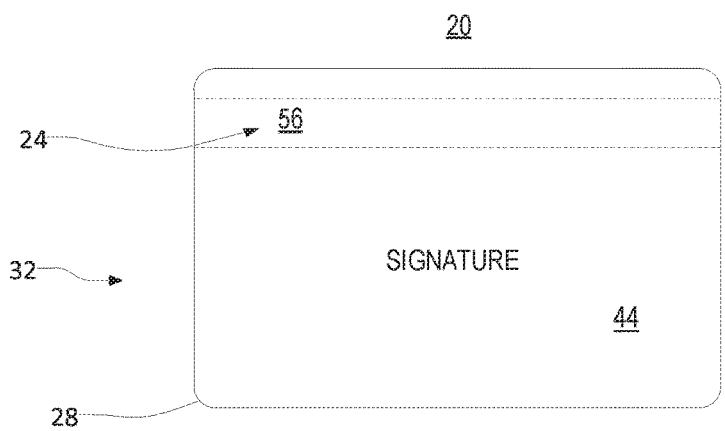
FIG. 6B is a bottom view of the exemplary transaction card of FIG. 6A.
Figure 6C:
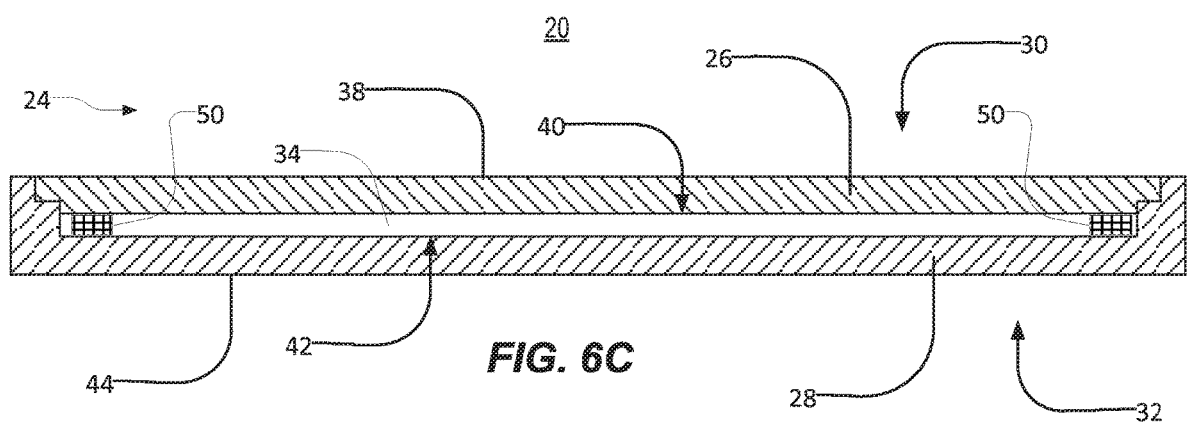
FIG. 6C is a cross-sectional view of the exemplary transaction card of FIG. 6A taken along line 6C-6C.

FIGS. 6A-6C show an exemplary embodiment of card 20 having a communication device 50 as a first data storage component 24. FIG. 6A shows a front view of card 20 from first side 30. As shown, first inlay surface 38 may include a microchip 48 (shown in dashed lines as an optional component), accessible through aperture 52 (also shown in dashed lines as an optional component), as a second, optional, data storage component 24. As shown in FIG. 6B, third optional data storage component 24, such as a magnetic strip 56 (shown in dashed lines as an optional component), may be disposed on second housing surface 44 and visible from second side 32 of card 20.

FIG. 6C depicts a cross-sectional view of card 20 of FIGS. 6A and 6B along line 6C-6C. As shown in FIG. 6C, inlay 26 and housing 28 may be configured to partially define space 34 when joined. For example, second inlay surface 40 and first housing surface 42 may partially define space 34. Space 34 may be a void space within card 20 or its components (e.g., inlay 26 and/or housing 28 may include cavities or recesses that partially define space 34). Space 34 may be configured to house or contain communication device 50. In other embodiments, space 34 may also or alternatively be configured to house or contain other components of card 20, such as interconnecting features (e.g., for joining inlay 26 and housing 28), electronics (e.g., data storage or transmission components, data processing components, lighting, power generation or storage components, circuitry components, etc.), and/or other components.

As also shown in FIG. 6C, inlay 26 and housing 28 may be joined via second inlay surface 40 and first housing surface 42. First inlay surface 38 may face outward (with respect to card 20) and away from first and second housing surfaces 42, 44. That is, first inlay surface 38 may face and be visible from first side 30 of card 20. Second inlay surface 40 may face inward (with respect to card 20) and toward first and second housing surfaces 42, 44. First housing surface 42 may face inward (with respect to card 20) and toward first and second inlay surfaces 38, 40. Second housing surface 44 may face outward (with respect to card 20) and away from first and second inlay surfaces 38, 40. That is, second housing surface 44 may face and be visible from second side 32 of card 20.

Figure 7:
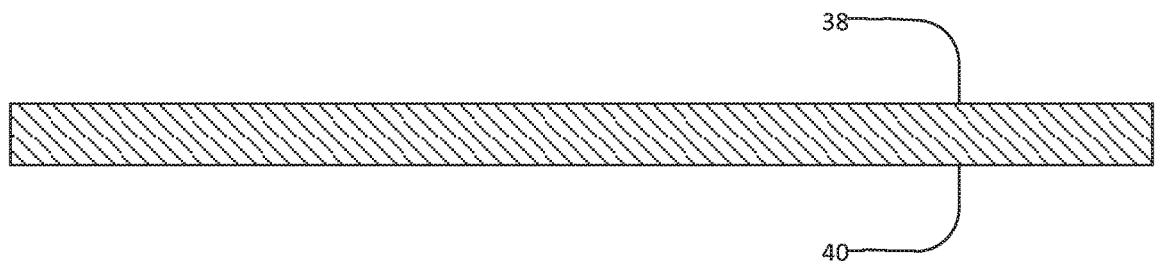
FIG. 7 is a cross-sectional view of an exemplary inlay component consistent with disclosed embodiments.

FIG. 7 shows an exemplary inlay component 26 comprising a fabric material. The term "fabric" as used herein refers to a material constructed using natural or synthetic fibers. The fabric may be constructed using, but is not limited to, a weaving process, knitting process, or nonwoven process. The term "woven" as used herein refers to any fabric material constructed through the interlacing of vertical and horizontal yarns. The term "knit" as used herein refers to any fabric material constructed by rows of interlocking loops. The term "yarn" as used herein refers to a continuous strand of fibers, formed into a thread, for use in weaving or knitting processes.

Nonwoven processes may include, but are not limited to, a stapling process (spinning, cutting, and laying a nonwoven fabric), a melt-blowing process, a spunlaid process (spinning and then directly dispersing a nonwoven fabric), a flashspin process, or the like.

As shown in FIG. 7, inlay component 26 may be a unitary structure comprising first inlay surface 38 and second inlay surface 40. As a unitary structure, inlay 26 may be formed of a fabric material having desired mechanical properties. That is, the fabric material of inlay 26 may be chosen to achieve desired stiffness, strength, and/or other measures of durability of the inlay 26 or the card 20. In order to achieve these desired characteristics, parameters of the fabric material of inlay 26 may be varied. For example, the fabric material of inlay 26 may be woven, knit, or nonwoven, may be constructed with different weaving patterns, may use different yarn weights, may contain different fabric finishes or coatings, fiber compositions including natural and/or synthetic fibers, and may contain varying thread counts.

In some embodiments, the fabric material of inlay 26 may be a woven fabric constructed using a specific weaving pattern. For example, the fabric material of inlay 26 may be constructed using, but is not limited to, any of the following weaving patterns: plain (or alternating), basket, satin, sateen, twill, ripstop, or jacquard. By constructing the fabric material of inlay 26 using different weaving patterns, the fabric material may have different mechanical properties. For example, an inlay 26 constructed using a plain weave may provide additional fabric stability. In some embodiments, an inlay 26 constructed using a satin weave may produce a fabric with increased flexibility. In other embodiments, an inlay 26 constructed using a ripstop weave with a crosshatch pattern containing reinforcement threads may be more resistant to ripping or tearing.

In some embodiments, the type of weaving pattern used to construct the fabric material of inlay 26 may enhance other desired characteristics for the fabric material, such as water, stain, or abrasion resistance. For example, in some embodiments, additional abrasion resistance may be gained where the weaving pattern used to construct the fabric material of inlay 26 includes longer floats in the weaving pattern. In some embodiments, the density of the weaving pattern (i.e., the number of threads in a given amount of space) used to construct the fabric material of inlay 26 may create a fabric material with limited or no porosity in order to enhance water and stain resistance.

In some embodiments, the fabric material of inlay 26 may be constructed using yarns of a specific weight. For example, in some embodiments, an inlay 26 constructed using a fabric with higher weight will produce a sturdier fabric. In some embodiments, the fabric material of inlay 26 may contain a specific thread count to obtain desired characteristics. The thread count may be calculated by counting the total number of warp ends (along the length) and weft ends (along the width) in two adjacent edges of a one-inch square of the fabric. For example, in some embodiments, a high thread count fabric may be used to construct the fabric material of inlay 26 in order to obtain a more durable fabric.

In general, as materials are thinned (such as for use in a transaction card having an overall thickness of about 30 thousandths of an inch), flexibility increases. Thus, an inlay having a unitary structure and comprising a fabric material, as in the example of FIG. 7, may comprise a single layer of fabric having desired mechanical properties. For example, in some embodiments, fabrics resulting in a stiffer (i.e., more rigid or sturdy) inlay may include aramid or para-aramid fabrics, such as poly-paraphenylene terephthalamide (e.g., Kevlar®). Suitable fabrics may include nonwoven fabrics, i.e., sheets of fibers that are chemically, thermally, or mechanically bonded. Nonwoven fabrics may include, for example, fibers of carbon, glass, aramid, polyester, thermoplastic, or mixtures thereof.

Fabrics for inlay 26 may also be chosen based on desired aesthetic and/or tactile properties. That is, in addition to meeting certain mechanical requirements, selected fabrics may have a desired look or feel. For example, nonwoven fabrics having a desired fiber matrix pattern or design may be used. In other embodiments, woven or knit fabrics having desired mechanical and aesthetic/tactile properties may be used. For example, sturdy woven fabrics, such as canvas, denim, or other woven cotton fabrics. By way of further example, the woven cotton fabric may be denim constructed with a 3:1 twill weave, 2:1 twill weave, or a plain weave. In some embodiments, other weaving patterns used to construct inlay 26 may enhance the appearance, touch, and feel of first inlay surface 38. In other embodiments, a high thread-count cotton-polyester blend fabric may be used. In yet other embodiments, synthetic fibers (e.g., polyester, or para-aramids, such as Kevlar®) may be used.

Figure 8:
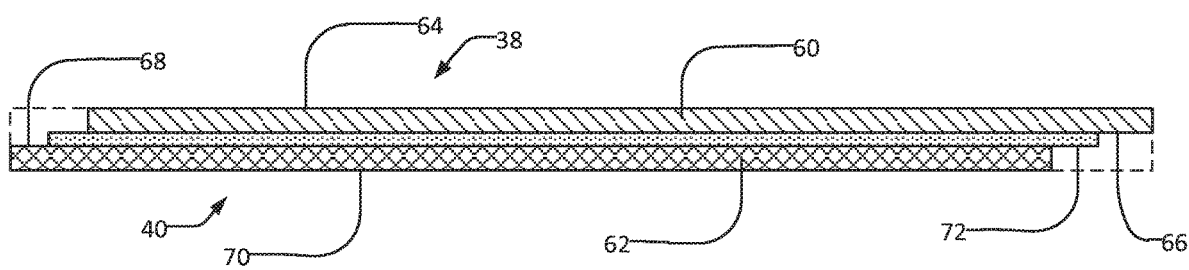
FIG. 8 is a cross-sectional view of an exemplary inlay component consistent with disclosed embodiments.

In other embodiments, for example, the embodiment shown in FIG. 8, inlay 26 may include a fabric layer 60 supported by a backer layer 62 to enhance mechanical performance of inlay 26 or card 20. For example, backer layer 62 may be joined with fabric layer 60 to increase rigidity, strength, and/or other mechanical properties, and to reduce warping or rippling when inlay 26 and housing 28 (depicted in FIGS. 2-6C) are joined. As shown, fabric layer 60 may have a first fabric surface 64 opposite a second fabric surface 66. Backer layer 62 may have a first backer surface 68 opposite a second backer surface 70. When a multilayer inlay (such as inlay 26 of FIG. 8) is assembled, first fabric surface 64 and second backer surface 70 may correspond to first inlay surface 38 and second inlay surface 40 (depicted in FIGS. 2-6C), respectively. Fabric layer 60 and backer layer 62 may be joined using an adhesive layer 72 or other suitable joining mechanism (e.g., lamination, fastening, interconnecting features, etc.). In other embodiments, backer layer 62 may be formed integrally with fabric layer 60, e.g., by forming backer layer 62 via hot melt directly on fabric layer 60. FIG. 8 is a partially cut-away cross-sectional view of an exemplary embodiment of inlay 26 showing fabric layer 60 joined to backer layer 62 by adhesive layer 72.

Including backer layer 62 with fabric layer 60 may allow fabric layer 60 to be thinner while also enabling inlay 26 to achieve desired mechanical properties. Thinner or less rigid fabric materials having desirable visual, aesthetic, and/or tactile properties may be joined with backer layer to provide inlay 26 with the desired visual, aesthetic, and/or tactile properties without rendering inlay 26 unacceptably flexible or delicate. In this way, fabrics that may be more visually appealing but less rigid may be used as fabric layer 60 in inlay 26.

Backer layer 62 may be formed of a material more rigid or sturdy than fabric layer 60. For example, backer layer 62 may be formed of wood, wood composite (e.g., medium-density fiberboard), metal, plastic (e.g., acrylic, polycarbonate, polyethylene terephthalate, thermoplastics, etc.), and/or other materials or combinations thereof. In some embodiments, backer layer 62 may comprise nonwoven fabric comprising fibers of, for example, carbon, glass, aramid, polyester, thermoplastic, poly-paraphenylene terephthalamide, or mixtures thereof.

As discussed, the fabric material for inlay 26 may be chosen based on a number of criteria, including desired visual, aesthetic, and/or tactile characteristics. Some fabric materials have desirable visual, aesthetic, and/or tactile characteristics in their natural state. That is, some fabrics have a desirable look or feel that can be lost if covered or coated with other materials. To preserve the natural look or feel of a fabric material, the fabric material of inlay 26 may, in some embodiments, be left in a natural state without coatings. In other embodiments, as shown in FIG. 9, inlay 26 (or just fabric layer 60) may be coated with a coating material 74 to provide additional benefits.

Figure 9:
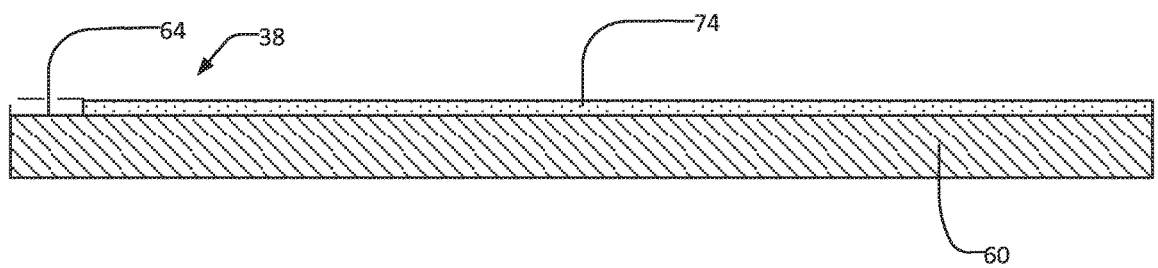
FIG. 9 is a cross-sectional view of an exemplary inlay component consistent with disclosed embodiments.

For example, as shown in FIG. 9, coating material 74 may be applied to fabric layer 60 of multi-layer inlay 26. In other embodiments, coating material 74 may be applied to first inlay surface 38 when inlay 26 comprises a unitary layer of fabric material (i.e., when inlay 26 does not include backer layer 62). Coating material 74 may be configured to cause inlay 26 to exhibit properties of being, for example, hydrophobic, oleophobic (i.e., stain resistant), laser-reactive, more durable, etc.

For example, coating material 74 may be a hydrophobic coating material configured to provide water-resistant or water-repellant functionality to inlay 26. Hydrophobic coating materials may include, for example, fluoropolymer-based coatings, silicone-based coatings, fluorochemical compounds, silastic or silicone elastomer coatings (e.g., acrylics, vinyls, polyurethanes and the like), rubber, polyvinyl chloride, and wax. Other types of water-resistant, water-repellant, and/or waterproof materials may be used. In other embodiments, coating material 74 may also or alternatively be oleophobic and stain-resistant. In some embodiments, coating material 74 may be applied using a chemical vapor deposition (CVD) process, allowing coating material 74 to be relatively very thin to minimize the effects of coating 74 on the fabric material's natural aesthetic/tactile properties. In other embodiments, coating material 74 may be sprayed, brushed, or otherwise applied to inlay 26. In some embodiments, inlay 26, fabric layer 60, and/or other components of card 20 may be dipped (separately or together) in coating material 74.

In some embodiments, coating material 74 may comprise a laser-reactive material to enable the underlying material (e.g., fabric) to be marked by a laser. That is, some fabric materials which may have desirable aesthetic and/or tactile properties may not react to laser light in a way that allows the fabric to be properly marked, etched, or engraved. Such fabrics may be coated with a laser-reactive material to provide laser-reactive functionality to the fabric. Laser-reactive materials may include materials configured to absorb energy from laser light to change color or shade. Non-limiting examples of laser-reactive materials may include antimony-doped tin oxide, metal oxide-coated micas including metal-doped metal oxide-coated micas, clays, talc, kaolins, chalks, aluminas, phyllosilicates, carbon black, salts of antimony, copper, and other metals such as antimony (III) oxide, metallic pigments such as aluminum flake pigments, and pearlescent pigments. Laser-reactive materials may also or alternatively include polymers, including, but not limited to, acrylic polymers, polyurethanes, polyethers, cellulosics, epoxy polymers and oligomers, polyesters, alkyds, and combinations thereof. Commercially available laser-reactive materials may be used to coat components of inlay 26.

Figure 10:
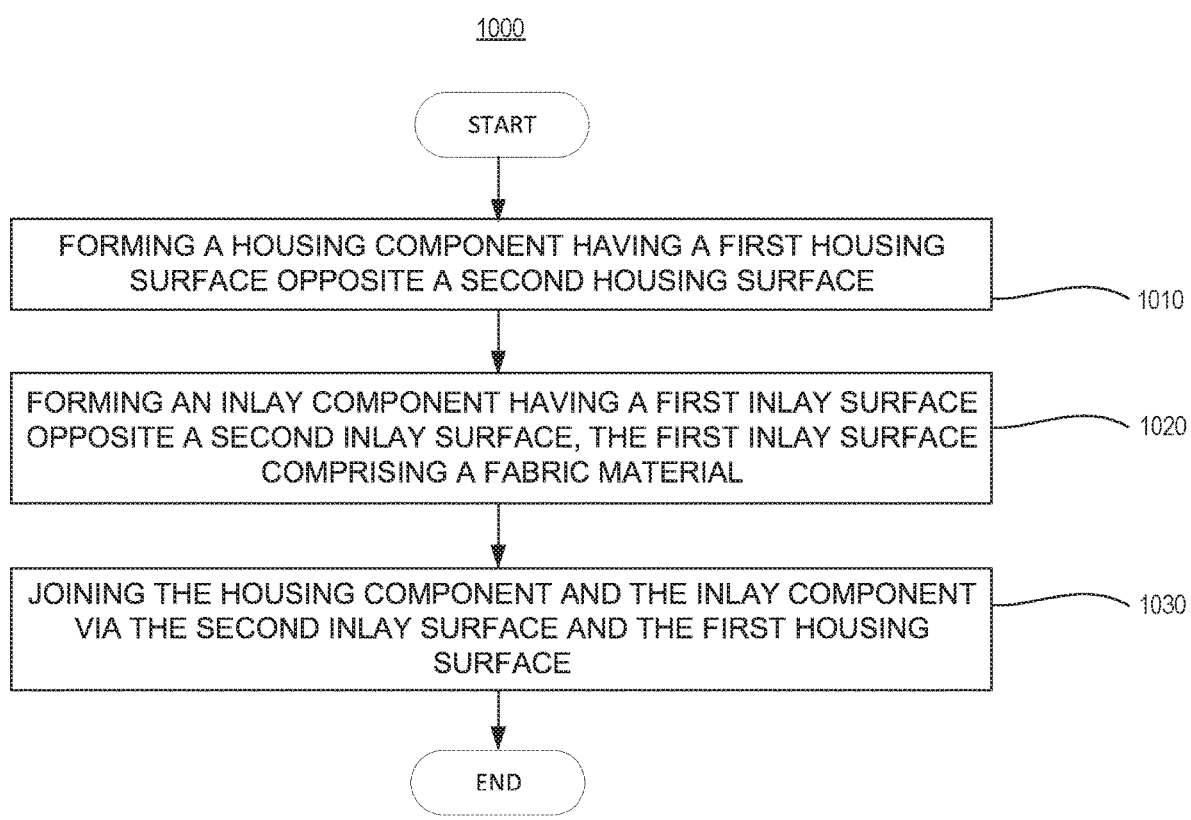
FIG. 10 is a flow chart of an exemplary method/process of manufacturing a transaction card consistent with disclosed embodiments.
Figure 11A:
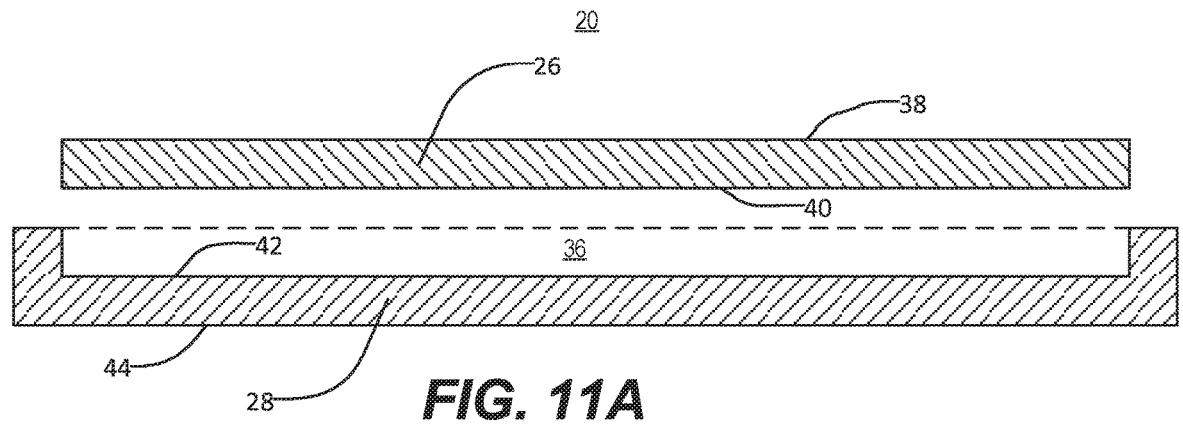
FIGS. 11A-11C show steps of manufacturing an exemplary transaction card consistent with disclosed embodiments.

FIG. 10 shows an exemplary method/process 1000 of forming a transaction card 20 consistent with disclosed embodiments. The process 1000 may include forming a housing component having a first housing surface opposite a second housing surface (Step 1010). FIG. 11A illustrates an example of step 1010 in which inlay component 26 and housing component 28 may be formed separately (i.e., as distinct components via separate, respective processes).

Housing 28 of FIGS. 2-6C may be formed during step 1010, for example, by a molding process (e.g., injection molding, compression molding, etc.), milling process, stamping process, or combinations thereof. In some embodiments, features of housing 28, such as first housing surface 42, second housing surface 44, and cavity 36 (as depicted in FIGS. 2, 5C, and 6C) may be formed during a process of injection molding housing 28. In other embodiments, a portion of housing 28 may be formed (e.g., by a molding or sheet forming process), and housing features may be formed or refined during a subsequent manufacturing process. For example, first and second housing surfaces 42, 44 and/or cavity 36 may be formed by forming or providing a portion of housing 28 and removing material to generate housing features (e.g., via a milling, laser cutting, or other process). Housing 28 may include first housing surface 42 and second housing surface 44 (as depicted in FIGS. 2, 4C, 5C, and 6C).

Process 1000 may also include forming an inlay component having a first inlay surface opposite a second inlay surface, wherein the first inlay surface comprises a fabric material (Step 1020). Inlay 26 of FIGS. 2-9 may be formed during step 1020. For example, forming inlay 26 may include weaving, knitting, or binding fibers of desired material, or by cutting or otherwise separating a portion of fabric material from a roll or sheet of stock material. In some embodiments, inlay 26 may be a unitary component (i.e., may be a single component or layer). Inlay 26 may include first inlay surface 38 and second inlay surface 4, as shown in FIG. 11A. In other embodiments, forming inlay 26 may include addition steps or sub-steps, as discussed below.

Figure 11B:
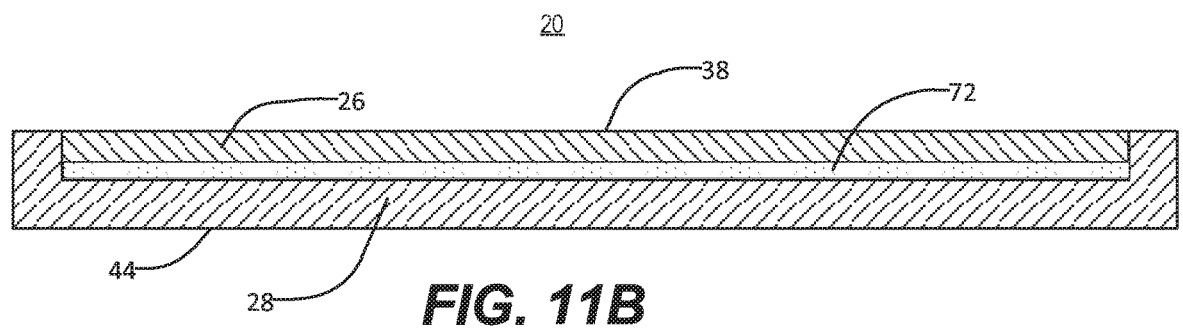
Figure 11C:
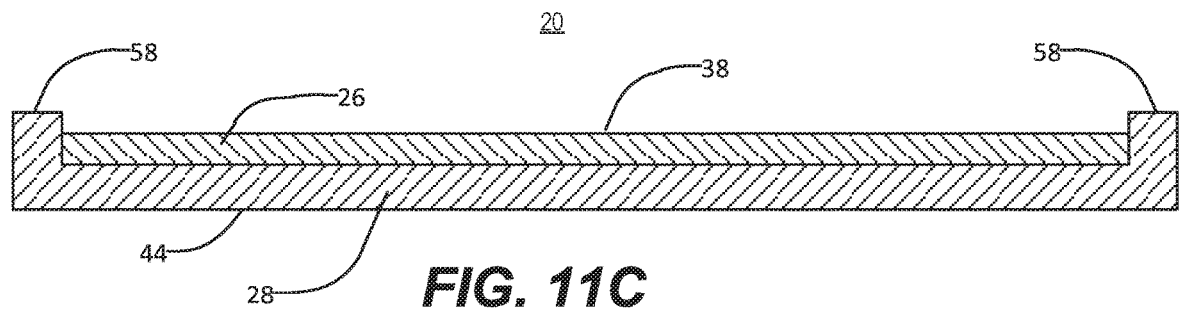

Process 1000 may also include joining the housing component and the inlay component via the second inlay surface and the first housing surface (Step 1030). With reference to FIGS. 11A-11C, inlay 26 and housing 28 may be brought together during step 1030 such that second inlay surface 40 faces and/or contacts first housing surface 42. First inlay surface 38 and second housing surface 44 may face away from each other (i.e., in opposite directions), and may each face away from each of second inlay surface 40 and first housing surface 42. In some embodiments, inlay 26 may be inserted (e.g., partially or fully) into cavity 36 of housing 28. Inlay 26 and housing 28 may be joined, for example, using an adhesive material, interconnecting features, fasteners, and/or another types of joining technique or mechanism. As shown in FIG. 11B, for example, adhesive layer 72 may be disposed between and contact each of second inlay surface 40 and first housing surface 42 for joining inlay 26 to housing 28. In some embodiments, inlay 26 may be inserted into cavity 36 of housing 28 such that first inlay surface 38 rests below a top surface of housing 28. As shown in FIG. 11C, for example, inlay 26 may be placed in housing 28 such that a top surface 58 of housing 28 extends beyond (or above) first inlay surface 38 in order to further protect inlay 26 and the edges of inlay 26 in particular from wear during use of transaction card 20. For example, first inlay surface 38 may be protected from scratching, tearing, or other wearing when card 20 is used (i.e., swiped or inserted into a card reader), dropped, slid across a surface (such as a counter, desk, or table), etc. In this way, the service life of card 20 may be increased.

Figure 12:
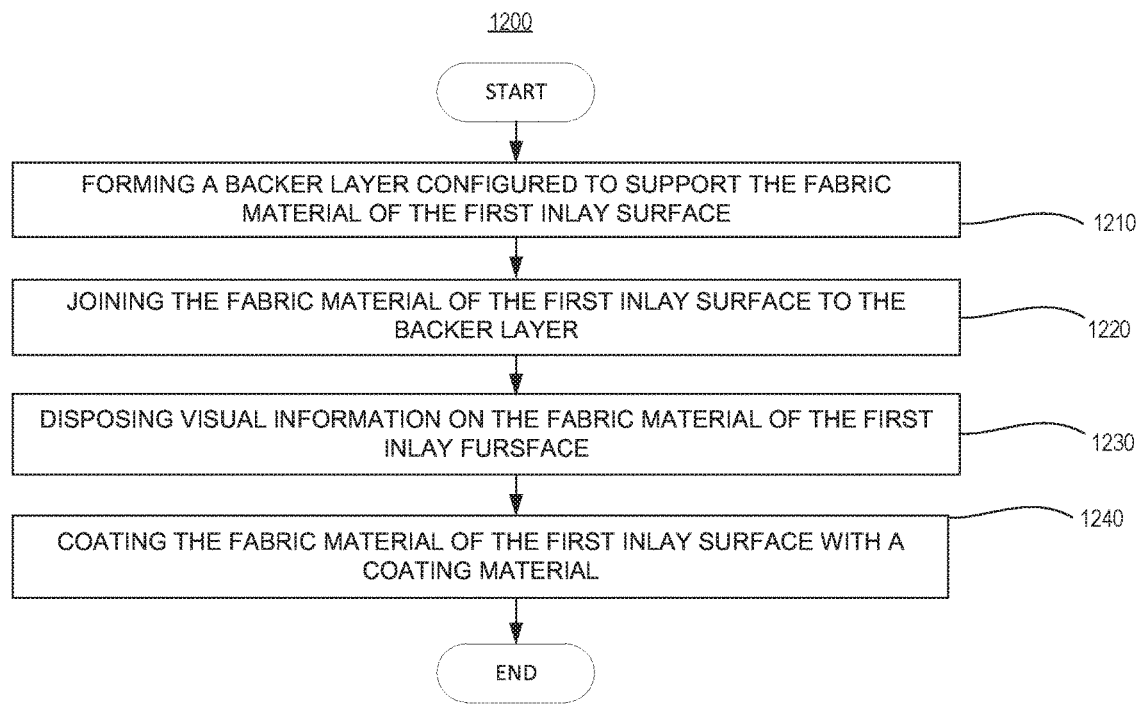
FIG. 12 is a flow chart of exemplary method/process steps of forming an inlay component consistent with disclosed embodiments.
Figure 13A:
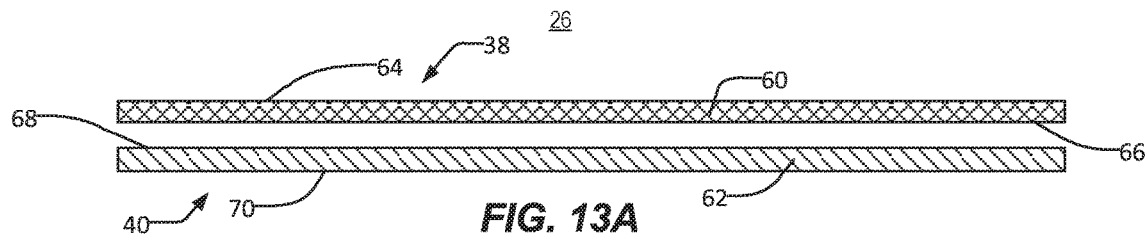
FIGS. 13A-13C show steps of forming an exemplary inlay component consistent with disclosed embodiments.

As described above, inlay component 26 may, in some embodiments, be formed as a unitary structure. In other embodiments, inlay 26 may comprise a plurality of components or subcomponents. FIG. 12 shows an exemplary process/method of forming an inlay component 26 having multiple subcomponents consistent with disclosed embodiments. Process 1200 may include forming a backer layer configured to support the fabric material of the first inlay surface (Step 1210). FIG. 13A illustrates an example of step 1210 in which a fabric layer 60 and a backer layer 62 may be formed separately (i.e., as distinct components via separate, respective processes).

Forming fabric layer 60 may include weaving, knitting, or binding fibers of desired material, or by cutting or otherwise separating a portion of fabric material from a roll or sheet of stock material. Fabric layer 60 may be formed to have a first fabric surface 64 opposite a second fabric surface 66. Correspondingly, backer layer 62 may include a first backer surface 68 opposite a second backer surface 70. Backer layer 62 may be formed of a material more rigid or sturdy than fabric layer 60. For example, backer layer 62 may be formed of wood, wood composite (e.g., medium-density fiberboard), metal, plastic (e.g., acrylic, polycarbonate, polyethylene terephthalate, thermoplastics, etc.), and/or other materials or combinations thereof. In some embodiments, backer layer 62 may also or alternatively comprise nonwoven fabric comprising fibers of, for example, carbon, glass, aramid, polyester, thermoplastic, poly-paraphenylene terephthalamide, or mixtures thereof. Backer layer 62 may support fabric layer 60 such that first fabric surface 64 corresponds to first inlay surface 38 and second backer layer 70 corresponds to second inlay layer 40 (as depicted in FIGS. 2, 4C, 5C, and 6C).

Figure 13B:
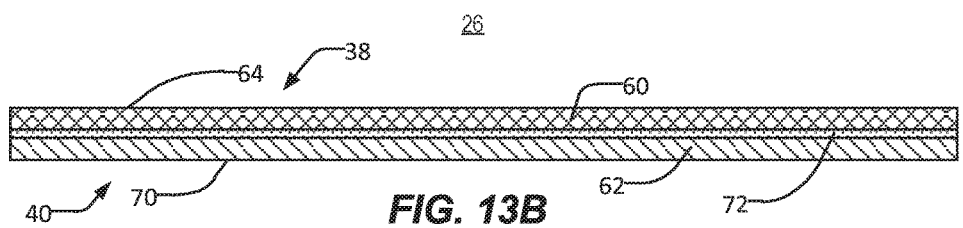

Process 1200 may also include joining the fabric layer and the backer layer via the second fabric surface and the first backer surface (Step 1220). With reference to FIGS. 13A and 13B, fabric layer 60 and backer layer 62 may be brought together during step 1220 such that second fabric surface 66 faces and/or contacts first backer surface 68. First fabric surface 64 and second backer surface 70 may face away from each other (i.e., in opposite directions), and may each face away from each of second fabric surface 66 and first backer surface 68. In some embodiments, fabric surface 60 and backer surface 62 may be joined, for example, using an adhesive material, interconnecting features, fasteners, and/or another types of joining technique or mechanism. As shown in FIG. 13B, for example, adhesive layer 72 may be disposed between and in contact with each of second fabric surface 66 and first backer surface 68 for joining fabric surface 60 to backer surface 62.

Process 1200 may also include disposing visible information on the fabric material of first inlay surface (Step 1230). Visible information may include, for example, personal information, such as information that is associated with a card, a user of the card, or information relating to an account associated with the card or card user. In some embodiments, visible information may include "transaction information," such as financial information (e.g., card numbers, account numbers, expiration dates etc.), individual-identifying information (e.g., name, address, signature, etc.), bank information, and/or transaction network information, logos, designs, graphics, and/or other information. Visible information may be disposed on first inlay surface 38 (e.g., on first fabric surface 64). In some embodiments, visible information may be formed into first inlay surface 38. That is, for example, visible information may be stamped, printed, etched, milled, laser-cut, embossed, embroidered, stitched, woven, etc., into or onto first inlay surface 38 (i.e., into or onto the fabric material of first inlay surface 38). In other embodiments, visible information may be disposed on second housing surface 44 in a similar manner.

Figure 13C:
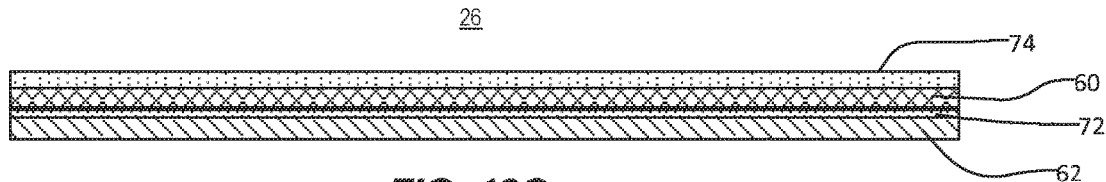

Process 1200 may further include coating the fabric material of the first inlay surface with a coating material (Step 1240). For example, as shown in FIG. 13C, coating material 74 may be disposed on fabric layer 60 to, for example, protect fabric layer 60 from the elements. In such an example, coating material 74 may be applied to fabric layer 60 to provide water-repellant, water-resistant, oleophobic (i.e., stain resistant), and/or laser reactive properties to inlay 26. For example, coating material 74 may be a hydrophobic coating material configured to provide water-resistant or water-repellant functionality to inlay 26. Hydrophobic coating materials may include, for example, fluoropolymer-based coatings, silicone-based coatings, fluorochemical compounds, silastic or silicone elastomer coatings (e.g., acrylics, vinyls, polyurethanes and the like), rubber, polyvinyl chloride, and wax. Other types of water-resistant, water-repellant, and/or waterproof materials may be used. In other embodiments, coating material 74 may also or alternatively be oleophobic and stain-resistant. In some embodiments, coating material 74 may be applied using a chemical vapor deposition (CVD) process, allowing coating material 74 to be relatively very thin to minimize the effects of coating 74 on the fabric material's natural visual, aesthetic, and/or tactile properties. In other embodiments, coating material 74 may be sprayed, brushed, or otherwise applied to inlay 26. In some embodiments, inlay 26, fabric layer 60, and/or other components of card 20 may be dipped (separately or together) in coating material 74.

In some embodiments, coating material 74 may comprise a laser-reactive material to enable the underlying material (e.g., fabric) to be marked by a laser (e.g., for providing visible information on fabric layer 60). That is, some fabric materials which may have desirable aesthetic and/or tactile properties may not react to laser light in a way that allows the fabric to be properly marked, etched, or engraved. Such fabrics may be coated with a laser-reactive material to provide laser-reactive functionality to the fabric. Laser-reactive materials may include materials configured to absorb energy from laser light to change color or shade. Non-limiting examples of laser-reactive materials may include antimony-doped tin oxide, metal oxide-coated micas including metal-doped metal oxide-coated micas, clays, talc, kaolins, chalks, aluminas, phyllosilicates, carbon black, salts of antimony, copper, and other metals such as antimony (III) oxide, metallic pigments such as aluminum flake pigments, and pearlescent pigments. Laser-reactive materials may also or alternatively include polymers, including, but not limited to, acrylic polymers, polyurethanes, polyethers, cellulosics, epoxy polymers and oligomers, polyesters, alkyds, and/or combinations thereof.

In such embodiments, step 1240 may be performed, at least in part, prior to step 1230. For example, fabric layer 60 may be coated with coating material 74, and the visual information may then be disposed either on coating material 74 (e.g., via laser or other method to which coating material 74 is reactive) or on fabric layer 60 by means of coating material 74 (e.g., by manipulating coating material 74 to only coat a portion of fabric layer 60 such that the visual information is visible via a visual or tactile difference between the portion of fabric layer 60 that is coated and the portion that is not). By way of further example, visual information may be disposed on second housing surface 44, after which fabric layer 60 may be coated with coating material 74, after which additional visual information may be disposed either on coating material 74 or on fabric layer 60 by means of coating material 74.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A transaction card, comprising:
   a housing component having a first housing surface opposite a second housing surface and forming a cavity defined by walls of the housing component; and
   an inlay component having a first inlay surface opposite a second inlay surface, the inlay and housing being joined such that the inlay component is disposed within the cavity, the first inlay surface comprising;
      a fabric material; and
      a backer layer configured to support the fabric material of the first inlay surface;
   wherein a space is defined by the walls of the housing component, the first housing surface, and the second inlay surface.

2. The transaction card of claim 1, further comprising a first data storage component disposed within the space.

3. The transaction card of claim 2, wherein the inlay component further comprises an aperture providing physical contact with a second data storage component.

4. The transaction card of claim 2, wherein the inlay component has an aperture providing physical contact with a second data storage component.

5. The transaction card of claim 2, wherein the housing component has an aperture providing physical contact with a second data storage component.

6. The transaction card of claim 2, wherein the first data storage comprises a communication device configured to transmit wireless data signals through at least one of the inlay component and the housing component.

7. The transaction card of claim 4, further comprising a third data storage component disposed on the second housing surface.

8. The transaction card of claim 7, wherein at least one of the first data storage component, the second data storage component, and the third data storage component comprise at least one of a Europay, Mastercard and Visa (EMV) chip, a magnetic strip, a near field communication antenna, a radiofrequency identification device, a Bluetooth device, or a WiFi device.

9. The transaction card of claim 1, wherein the housing component and the second inlay surface are joined with an adhesive material.

10. The transaction card of claim 1, wherein the housing component and the inlay component are laminated together.

11. A transaction card, comprising:
    a housing component having a first housing surface opposite a second housing surface forming a cavity defined by walls of the housing component;
    a fabric surface including visible information thereon;
    a backer layer supporting the fabric surface and having greater rigidity than the fabric surface, the backer layer having a backer layer surface opposite the fabric surface such that the fabric surface is visible;
    a data storage component disposed within a space defined by the walls of the housing component, the first housing surface, and the backer layer surface.

12. The transaction card of claim 11, further comprising a layer of adhesive disposed between the fabric surface and the backer layer.

13. The transaction card of claim 11, wherein the fabric surface and the backer layer are laminated together.

14. The transaction card of claim 11, wherein the backer layer comprises at least one of wood, wood composite, metal, or plastic.

15. The transaction card of claim 11, further comprising a coating material disposed on the fabric surface.

16. The transaction card of claim 15, wherein the coating material is hydrophobic.

17. The transaction card of claim 15, wherein the coating material is oleophobic.

18. The transaction card of claim 15, wherein the coating material is laser-reactive.

19. The transaction card of claim 18, further comprising visible information disposed on the coating material using a laser.

20. A transaction card, comprising:
    a housing component having a first housing surface opposite a second housing surface and forming a cavity defined by walls of the housing component; and
    an inlay component having a first inlay surface opposite a second inlay surface, the inlay and housing being joined such that the inlay component is disposed within the cavity, the first inlay surface comprising;
       a fabric material; and
       a backer layer configured to support the fabric material of the first inlay surface;

a communication device disposed within a space defined by the walls of the housing component, the first housing surface, and the second inlay surface;
a microchip accessible through an aperture located on the inlay component; and
a magnetic strip disposed on the second housing surface.

\* \* \* \* \*